United States Patent
Green et al.

(10) Patent No.: US 7,681,242 B2
(45) Date of Patent: Mar. 16, 2010

(54) ALLOCATION OF NETWORK RESOURCES

(75) Inventors: Tammy Anita Green, Provo, UT (US); Lloyd Leon Burch, Payson, UT (US); Stephen R. Carter, Spanish Fork, UT (US); Douglas G. Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 991 days.

(21) Appl. No.: 10/927,553

(22) Filed: Aug. 26, 2004

(65) Prior Publication Data
US 2006/0059565 A1 Mar. 16, 2006

(51) Int. Cl.
H04L 9/32 (2006.01)
(52) U.S. Cl. ...................................................... 726/27
(58) Field of Classification Search .................. 726/27; 709/249
See application file for complete search history.

(56) References Cited

U.S. PATENT DOCUMENTS

| | | | | |
|---|---|---|---|---|
| 5,546,541 A | 8/1996 | Drew et al. | ............ | 395/200.15 |
| 5,880,730 A | 3/1999 | Durand | ........................ | 345/348 |
| 6,088,732 A | 7/2000 | Smith et al. | .................. | 709/229 |
| 6,151,688 A | 11/2000 | Wipfel et al. | ................. | 714/48 |
| 6,185,612 B1 * | 2/2001 | Jensen et al. | ................. | 709/223 |
| 6,338,112 B1 | 1/2002 | Wipfel et al. | ................ | 710/269 |
| 6,353,898 B1 | 3/2002 | Wipfel et al. | .................. | 714/48 |
| 6,359,900 B1 | 3/2002 | Dinakar et al. | ............... | 370/458 |
| 6,442,706 B1 | 8/2002 | Wahl et al. | ...................... | 714/6 |
| 6,523,065 B1 | 2/2003 | Combs et al. | | |
| 6,618,818 B1 | 9/2003 | Wahl et al. | ...................... | 714/6 |
| 6,957,199 B1 * | 10/2005 | Fisher | .......................... | 705/78 |
| 7,043,225 B1 * | 5/2006 | Patel et al. | ................... | 455/405 |
| 7,254,645 B2 * | 8/2007 | Nishi | ........................ | 709/249 |
| 2002/0120744 A1 | 8/2002 | Chellis et al. | | |
| 2003/0014521 A1 | 1/2003 | Elson et al. | | |
| 2005/0081028 A1 * | 4/2005 | Thornton et al. | ............ | 713/156 |

OTHER PUBLICATIONS

"European Search Report", Search Report received in EP05107532, (Nov. 9, 2005), 12 pgs.

* cited by examiner

Primary Examiner—Kambiz Zand
Assistant Examiner—Aubrey H Wyszynski
(74) Attorney, Agent, or Firm—Schwegman, Lundberg & Woessner, P.A.

(57) ABSTRACT

Techniques are provided for allocating resources over a network. A resource consumer requests access to a resource over a network. As part of that request, the resource consumer acquires information that permits it to securely communicate with a resource provider. The resource provider controls the resource and once satisfied with the security of a request from a resource consumer allocates the resource for access by the resource consumer.

31 Claims, 3 Drawing Sheets

ALLOCATION OF NETWORK RESOURCES

FIELD OF THE INVENTION

The invention relates generally to data processing and more specifically to techniques for allocating resources over a network, where those resources perform the data processing.

BACKGROUND OF THE INVENTION

Organizations and individuals possess tremendous amounts of computing resources and often these resources are interconnected with one another over a network, such as the Internet. Resources may include storage devices, processing devices, memory devices, bandwidth devices, and the like. Many times a vast majority of these available resources are idle or under utilized. This has the potential of providing a tremendous opportunity to other network users whom at different times lack enough resources or have fully loaded resources which are not available to perform a desired task.

Unfortunately, organizations and individuals are unwilling to share or sell access to their idle or under utilized resources. This is so, because resource owners fear misuse of their resources, fear exposure of confidential information contained within environments of their resources, and fear exposing their resources during the process to third-party intruders and/or to electronic viruses.

The concerns of resource owners are well-founded with existing network communications. That is, just a single misuse of an owner's resources can have catastrophic effects for an individual or an organization. Moreover, because the Internet is a chaotic environment with the identities of users often feigned and information transmitted over public communication lines, existing techniques cannot guarantee that misuse will not occur.

A few techniques do exist to assuage concerns of resource owners and to provide some level of guarantees that misuse of resources will not occur. One conventional technique is to restrict access to dedicated networks that are not available to unauthorized users. This approach pretty much excludes using the Internet and taking advantage of its ease of access and pervasive connectivity. Moreover, this approach is expensive and often proves more expensive to the parties that desire to share resources than it would be to have the party that needs additional resources to just buy the needed additional resources. Another approach is to use Virtual Private Networks (VPNs). But, VPNs are reliant mostly on a user's identification and password, such that after these credentials are provided a user has access to the portal in any way that might be considered. Intruders often use these types of entry portals and known defects of the hosting machine (e.g., buffer overflow) to infiltrate a machine and its attendant network. Thus, the VPN itself presents security issues. Furthermore, VPNs require custom encryption, which needs supported within both environments of the parties sharing resources and which requires dedicated ports to be reserved, purchased, and set aside to support each different VPN. Thus, VPNs still pose a number of security risks and are also expensive and require human support to establish, maintain, and manage. Accordingly, VPNs have not resulted in pervasive sharing of idle and/or under utilized resources.

Therefore there is a need for improved allocation of resources over a network, such that idle or under utilized resources are securely shared over the network in a dynamic, trusted, and cost effective manner.

SUMMARY OF THE INVENTION

In various embodiments of the invention, techniques are presented for allocating resources over a network. A resource consumer makes requests for resources and acquires authentication information for securely communicating with resource providers that control the resources. When a resource consumer and provider have established secure and trusted communications with one another, the resource provider allocates a resource or portion of a resource to the requesting resource consumer. The resource consumer then interacts with its allocated resource or allocated portion of the resource over the network in a secure manner.

More specifically, and in an embodiment, a method for facilitating the allocation of a resource is presented. A request is received to allocate at least a portion of a resource. A trust relationship is dynamically established between the resource and a requestor that issued the request. If the trust relationship was successfully established, then at least the portion of the resource is allocated to the requestor for subsequent consumption.

DETAILED DESCRIPTION OF THE INVENTION

Figure 1:
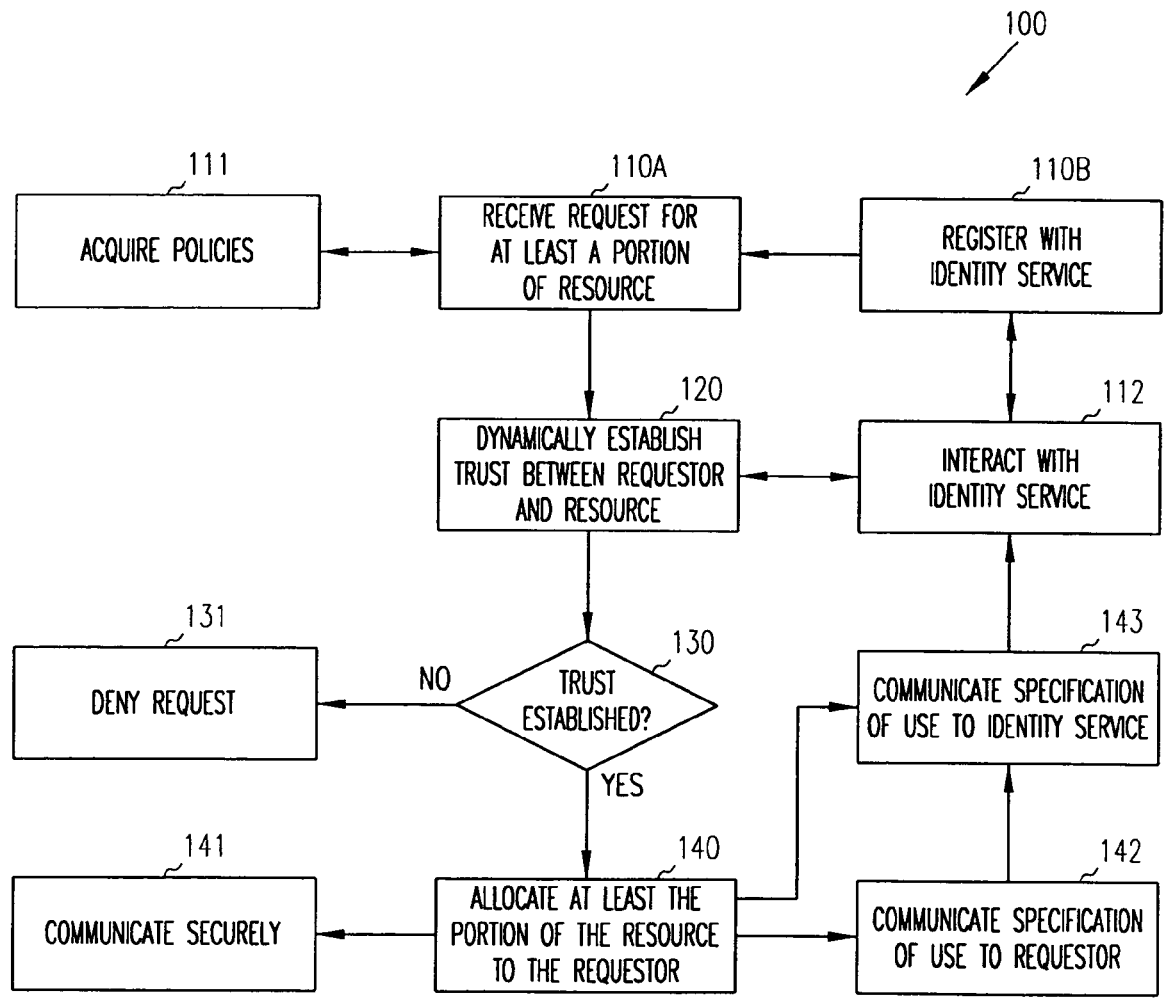
FIG. 1 is a diagram of a method for allocating a resource, according to an example embodiment.

In various embodiments of the invention, the phrases "resource provider" and "resource consumer" are used. A resource provider has a resource that it desires to make available for access to resource consumers. Conversely, a resource consumer desires access to one or more resources of a resource provider. A resource consumer may also be a resource provider, and vice versa. That is, the designations of providers or consumers are dependent upon the task that a client is performing. For one transaction a client may be a resource consumer, and for another concurrent transaction the same client may be a resource provider. A client is a processing device, a service processing on a processing device, and/or a user logically interfaced to a processing device.

A "resource" as used herein, refers to storage, memory, processing devices, bandwidth devices, and the like. The resource providers make decisions as to whether to make a resource or a selective portion of a resource available for access or allocation to resource consumers.

In various embodiments of the invention, an identity service is used. The identity service provides a trusted technique for authenticating resources, resource consumers, and resource providers which are participating in network transactions. The identity service may also provide identity/authentication information and authenticating mechanisms to the participants, such that one participant can become trusted and authenticated to another participant. In this sense, the identity service is a trusted intermediary and facilitator to the participants of the network, where those participants engage in novel allocation of resources over that network.

The identity service may also be viewed as a modified registration or management service, where resource providers register available resources or portions of those resources with the identity service. The identity service maintains anonymity between providers and consumers and facilitates the distribution of resources or portions of resources from providers to consumers by providing security and techniques for the consumers and providers to engage in sharing a resource or portion of a resource in trusted and secure manners. That is, the identity or modified registration service facilitates matching consumers with resources of providers and provides the consumers with information useful in authenticating to the providers and/or the resources, such that consumers can acquire access to the resources.

The identity service may also provide a variety of other services. Examples of an identity service can be found in: U.S. patent Ser. No. 10/765,523 ("Techniques for Dynamically Establishing and Managing Authentication and Trust Relationships"), Ser. No. 10/767,884 ("Techniques for Establishing and Managing a Distributed Credential Store"), and Ser. No. 10/770,677 ("Techniques for Dynamically Establishing and Managing Trust Relationships"). These applications are commonly assigned to Novell, Inc. of Provo, Utah and the disclosures of which are incorporated by reference herein.

In one embodiment, the techniques presented herein are incorporated into network arrangements, services, and products, such as proxy services, routers, gateways, clients, servers, and the like. These techniques facilitate the secure and trusted allocation of resources over a network in a dynamic fashion, where the network itself may be chaotic and inherently insecure, such as the Internet.

FIG. 1 is a flowchart of a method 100 for allocating a resource over a network. The method 100 is implemented in a machine-accessible and readable medium and is operational over a network. The network may be hardwired, wireless, or a combination of hardwired and wireless. In one embodiment, the processing of the method 100 (herein after "processing") is implemented on a resource provider and represents processing of that resource provider to allocate a resource or a portion of a resource over the network to a resource consumer.

Initially, the processing decides or negotiates to make a resource or a portion of a resource accessible over a network to resource consumers. Decisions to provide a resource or portion of a resource may be based on contractual arrangements, automated requests, and a variety of other reasons. The point is that the processing decides to make a resource or portion of a resource available for external network resource consumers to access. The identity of the particular resource or portion of the resource may be resolved based on utilization, policies, agreements, etc. A deciding event during the processing is a trust credential potentially crafted to conform to contractual arrangements, such that resources are not made available unless the trust credential is valid.

Once the decision is made to make a particular resource or portion thereof available over a network, a request, at 110A, is received from a resource consumer for allocation of that resource or portion thereof (hereinafter "resource"). On some embodiments, at 110B, the requestor (resource consumer) may have become aware of resource after the processing registers the resource with an identity service/registration service. That is, the processing essentially publishes the availability of the resource with a third party (identity service or registration service); the third party may push the registration to requestors or may provide the registration to requestors when queried.

In some embodiments, at 111, the received request may be circumscribed by acquired policies. Policies are statements or conditions regarding requesters, resources, and/or usage of resources. Thus, the processing may restrict allocation of a requested resource to certain times of the day, calendar days, usage levels, processing (e.g., media streaming only, etc.), and the like. Policies may also restrict an amount of usage for a resource that a requestor can have. For example, maybe the processing desires to make only 10% of its available idle bandwidth available to the requester. A policy may also dictate that the requested resource not be allocated unless a certain minimum level of service is capable of being provided from that resource to the requestor. A wide-variety of policy controls may be associated with any particular received request, requester, or resource. All such usage strictures are intended to be included in the various embodiments presented herein.

In some embodiments, at 112, the processing interacts with an identity/registration service as was described above. The identity service acts a facilitator to enforce the strictures, access, and allocation desires of the processing. Accordingly, the identity service may provide the mechanisms for making the identity of the resource known to requestors, may provide the mechanisms for communicating or acquiring policies, and as will be described below may facilitate secure and trusted communications between the processing, requestors, and the resource being allocated over the network.

At 120, the processing dynamically attempts to establish a trusted and secure relationship with the requestor. In order for the processing to be assured that the requestor is who it purports to be, the processing needs to be satisfied that it can authenticate the requestor. One technique for doing this is for the processing to provide a recognized trusted credential to the resource provider or to the resource itself. This credential may have been acquired by the requestor from a trusted third-party, such as an identity service. In other arrangements, the requestor provides authentication information (may also be considered a trusted credential or trust certificate) and an authentication technique recognized or expected by the processing. The trust credential may represent a contract, and the contract may be expressed as an assertion which may be relied upon. Examples of credentials, certificates, and contracts are found in the identity services mentioned and incorporated by reference above. The processing can either validate the authentication information itself or may enlist the dynamic services of the identity service.

In some embodiments, the identity service maintains the identities of the requestor and the processing in a secure manner that is separate and distinct from the two participating entities. When a requestor wants to contact a particular processing instance for a desired resource, it acquires authentication information to achieve this through the identity service. The authentication information can be viewed as the trusted credential discussed above. Both the requestor and the processing are in pre-established or dynamically established trusted relationships with the identity service. The requestor then submits the authentication information using a provided authentication technique to the processing. The processing asks the identity service if this provided information is legitimate or, in some other embodiments, validates the provided information itself. Examples of identity services with these and other features were incorporated by reference and described above.

If the processing, at 130, is unable to establish a dynamic and trusted relationship with the requestor, then, at 131, the request for the resource is denied. However, if the processing, at 130, is able to successfully establish the dynamic and trusted relationship with the requestor, then, at 140, the processing allocates or reserves the resource (or at least a portion of the resource) for the requestor to access over the network for purposes of the requestor performing some processing, network transactions, or storage of data.

While the requestor accesses the resource it was allocated, information may be exchanged between the resource and the requestor. This information is communicated securely, at 141. That is, the data may be transmitted via secure protocols (e.g., Hyper Text Transfer Protocol (HTTP) over a Secure Socket Layer (SSL), referred to as HTTPS) and/or the data may be encrypted with certificates, signatures, and/or other keys. The point is that the resource and the requestor securely interact with one another. This minimizes potential intrusion possibilities and assures the processing that access is safe and uncompromised.

In some embodiments, at 142, the processing may also directly or indirectly communicate a consumption specification to the requester before the requester is given access to the resource. The consumption specification is similar to policies described above in that it circumscribes how and under what conditions the requester may access the resource. The specification may be dynamically provided to the requestor once the resource is allocated to the requestor.

In another embodiment, at 143, the processing may indirectly communicate the consumption specification to the requestor by communicating the specification to an identity service. This may occur before the request is even received for the resource and may be managed by the identity service on behalf of the processing. In this embodiment, the specification may be global in a sense that it defines usage of a resource for a plurality of different requestors. Thus, the specification may indicate that requester A receives 10% of the resource and requestor B receives 90% or 100% of the resource. If requestor B is using all 100%, then requestor A is kicked off or denied access to the resource. Moreover, if a resource is fully consumed and no longer available, then resource availability is set such that the resource is no longer available for a requestor to request for consumption.

The processing may create a variety of policies or consumption specifications that may be directly or indirectly (via an identity, management, or registration service) communicated to requesters. For example, policies or specifications may be directed to groups of different processing resources, and each resource provided priorities or prioritized by category. As another example, the policies or specification could instruct the identity service (may also be a management or a registration service) to manage and distribute utilization between pools of identified resources. In this example, utilization metrics may be periodically communicated to the identity service or based on allocation the identity service may be able to resolve utilization metrics on its own.

Specifications or policies may also define what types or requesters or types of consumption are permissible or more preferred. For example, a university or open source community may receive priority access or dedicated access to certain resources or pools of resources. As another example, a resource may be available to a certain requestor to perform a certain task, such as storing photographs, processing media data, etc.

Specification or policies may also be hierarchical. This means that higher-level or more global specifications can override lower-level or local specifications. For example, an entire enterprise may have policies with respect to its resources, concurrently individual groups or users within the enterprise may have their own policies for their resources, such that when a conflict occurs the enterprise policies prevail. Moreover, global rules could be associated with the hierarchical policies, such that when a particular conflict occurs the rules resolve priority. In other arrangements, the policies are not hierarchical. That is, policies do not have to be interrelated in a hierarchical fashion for some embodiments of the invention.

In still other embodiments, the processing may wish to preserve its anonymity, such that it provides alias names for resources that only it is aware of. A requestor accesses a resource with the alias names and the alias names are distributed by the identity service. Moreover, the requestor may be able to create pools of resources using aliases where a number of the resources are associated with entirely different processing instances (e.g., different resource providers).

In yet more arrangements, the processing may publish characteristics of resources it is making available for allocation with the identity service. The characteristics (e.g., processing speed, memory speed or size, storage size, bandwidth capability, etc.) may be indexed and mapped within the identity service, such that requestors can search for resources that meet there access needs.

The method 100 demonstrates how resources may be allocated and consumed in novel manners over a network. Resource access is secure and trusted, such that resource providers are enticed to participate and provide resources. This takes advantage of the tremendous potential of the Internet, which has heretofore been unrealized, and that is the ability to securely load balance and/or utilize decentralized and distributed resources controlled by a myriad of different resource providers, and those providers may be organizations, governments, and/or individuals.

Figure 2:
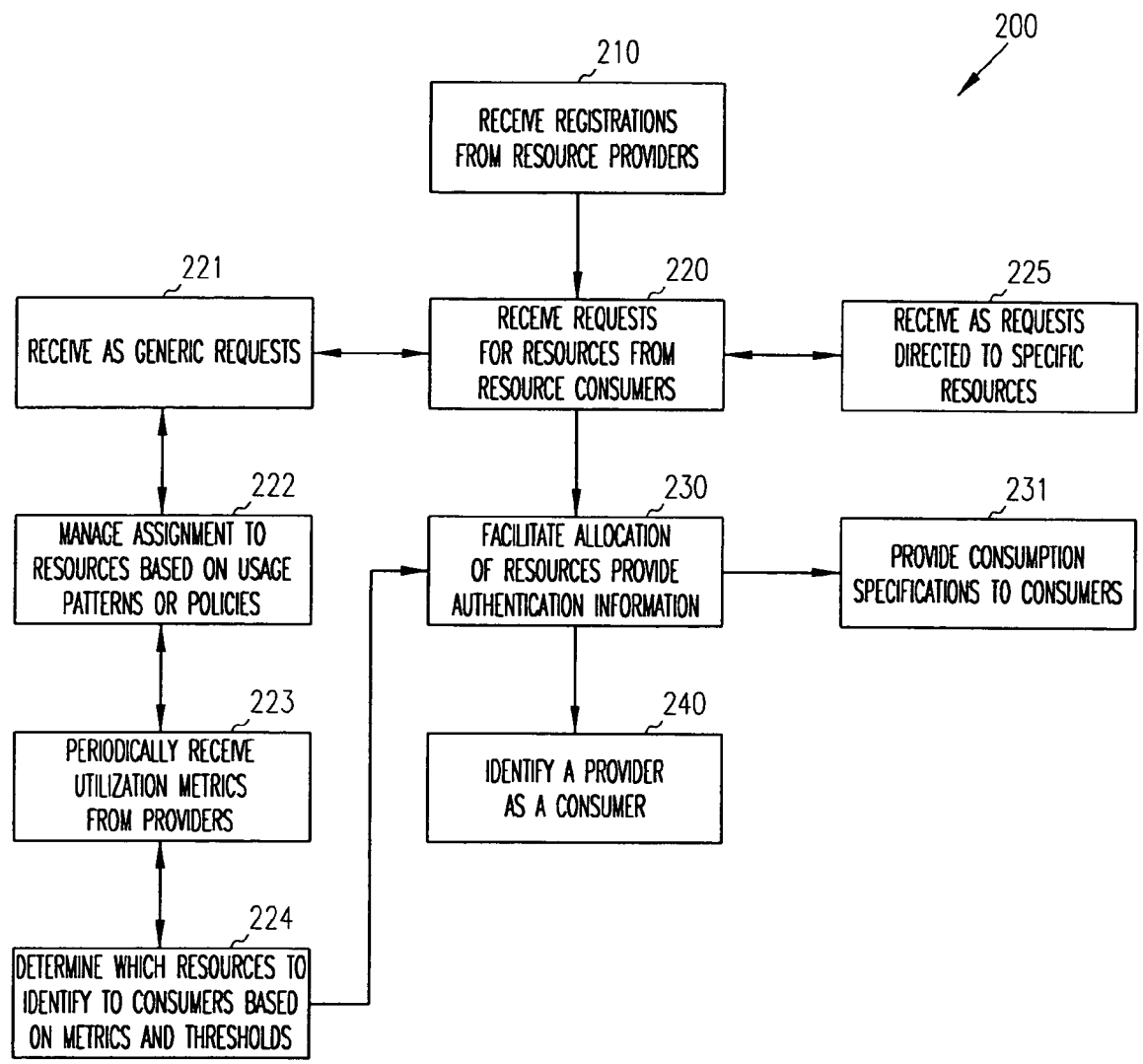
FIG. 2 is a flowchart of a method for facilitating the allocation of resources, according to an example embodiment.

FIG. 2 is a flowchart of a method 200 for facilitating the allocation of resources over a network. The method 200 (hereinafter "identity service") is implemented in a machine-accessible and readable medium. The medium includes instructions for processing the services of the identity service, such that when the instructions are accessed the processing described herein and below is performed. The medium may be removable, memory, and/or storage. Thus, in one embodiment, the medium is interfaced to a processing device and the instructions loaded and executed on that processing device. In another embodiment, the medium is memory associated with a processing device. In still another embodiment, the medium is a remote site over a network that is accessed and the instructions downloaded to processing device, where the instructions are loaded and executed.

The method 100 described processing associated with a resource provider. Conversely, the method 200 describes processing associated with an identity service. Again, it should be pointed out that the identity service may also be viewed as a modified registration and/or management service designed to perform the processing described herein and below. Moreover, in some embodiment, the identity service is a modified and enhanced version of the identity services described and incorporated by reference above.

Initially, the identity service is in a trusted relationship with resource providers and resource consumers. Resource consumers may be unaware of the resource providers and vice versa. The identity service facilitates trusted and dynamic relationships between consumers and providers for purposes of allocating resources (or portions thereof) over a network. In some embodiments, the identity service may also manage resource assignments on behalf of providers and may communicate policies or consumption specifications to consumers.

At 210, the identity service receives resource registrations from resource providers. The registrations identify how the resource may be contacted (e.g., the reference name or label), so that a resource consumer may acquire access or allocation to the resources. Essentially, the registration informs the identity service of an identity of an available resource.

After one or more resource registrations are received from resource providers, requests are received from resource consumers for desired consumption of the resources. In some embodiments, at 221, these requests are generic meaning that the requests are not directed to any particular identity of a registered resource. In these embodiments, at 222, the identity service manages the assignment of resource identities to the resource consumers. Resource assignment may be based on a variety of pre-existing or dynamically defined information.

For example, the identity service may receive characteristics that match published characteristics of a registered resource. A resource consumer and resource provider's trust relationship and corresponding trust specification are validated before attempting a match on resource characteristics, such that only valid relationships are considered before the matching takes place on resource characteristics. Additionally, policies, usage metrics, or statistics for the resources may drive assignment of particular registered resources to particular resource consumers. Thus, in one embodiment, at 223, resource providers may periodically communicate utilization metrics of its registered resources back to the identity service. Alternatively, the identity service may estimate the utilization metrics based on actions that it has already taken with respect to registered resource assignments. Moreover, at 224, pre-existing threshold may be compared to the utilization metrics in order to determine when assignments are proper. These thresholds may be configured within the identity service by way of policies or may be dynamically altered or communicated from the resource providers.

In other embodiments, at 225, a resource consumer may submit a request for a specific resource. This may occur when the consumer has used or identified a particular resource that it likes to use or requires for use. Again, the identity of the specific resource may still be aliased by the resource provider unbeknownst to the resource consumer.

At 230, the identity service facilitates allocation of the resources to the resource consumers. Facilitation occurs by the identity service providing authentication information and perhaps specific authentication techniques that the resource consumer uses to authenticate to a particular resource provider that controls the resource being allocated. The authentication information and/or techniques may be specific to the resource provider or specific to the resource being allocated.

In one embodiment, at 231, the identity service may also provide consumption specifications to the resource consumers. Again, the consumption specifications are policies that the resource consumer should conform to in order to ensure proper access to the allocated resource. These consumption specifications may be hierarchical and managed and distributed by the identity service. Some may be preconfigured in the identity service, while others may be supplied during registration from the resource providers. Some may be associated with specific resources. Others may be associated with groups or categories of resources. Moreover, in some instances, specifications may be dynamically changed by resource providers. Specifications may also provide priorities for resources and the rules associated with prioritization or rules associated with resolving conflicting and competing policies.

Resource providers may also be resource consumers. That is, for one transaction a requestor may be identified by the identity service, at 240, as a resource provider and for another transaction the same requestor may be identified as a resource consumer. A participant's role for any given transaction and its designation is maintained and managed by the identity service.

Figure 3:
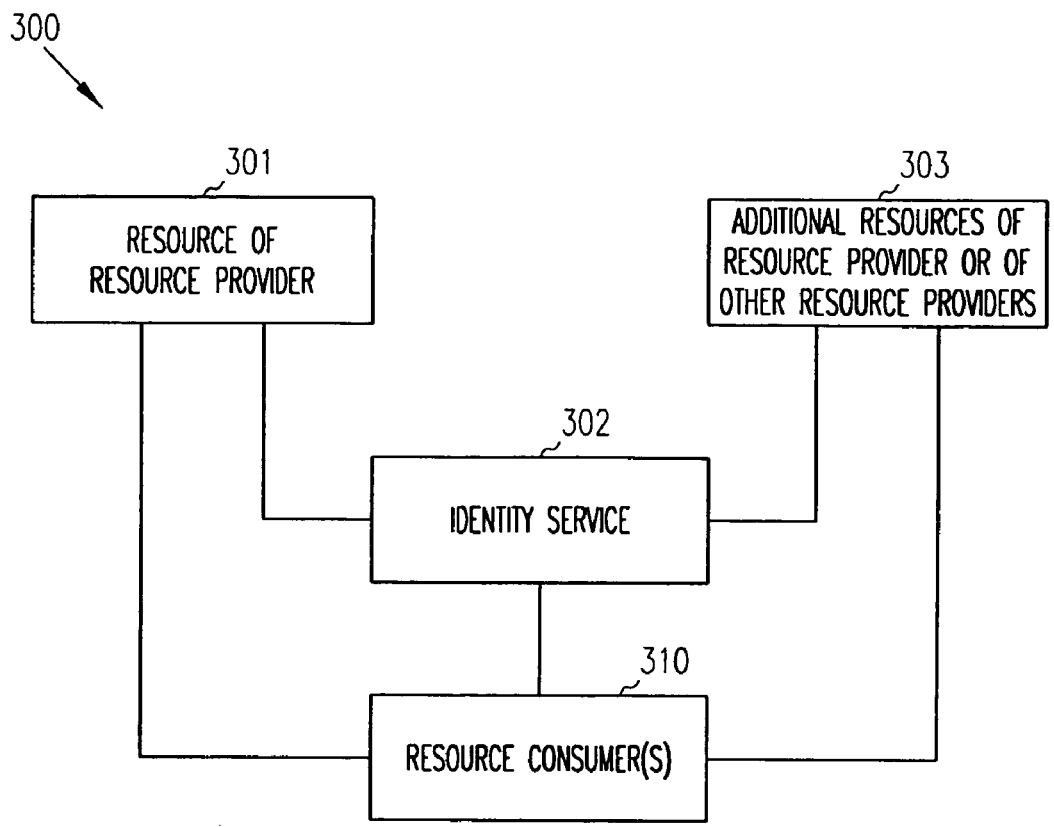
FIG. 3 is a diagram of a network resource allocation system, according to an example embodiment.

FIG. 3 is a diagram of a network resource allocation system 300. The network resource allocation system 300 is implemented in a machine-accessible and readable medium and is operational over a network. In one embodiment, various components of the network resource allocation system 300 implement, among other things, the processing of methods 100 and 200 of FIGS. 1 and 2. The components of the network resource allocation system 300 may be implemented in hardware, software, and/or combinations of hardware and software.

The network resource allocation system 300 minimally includes a resource 301 and an identity service 302. In alternative embodiments, the network resource allocation system 300 also includes additional resources 303. The network resource allocation system 300 interacts with resource consumers 310 and resource providers (not shown in FIG. 3) for purposes of facilitating in a secure and trusted manner the allocation of the resource 301 over a network to a resource consumer 310. During operation of the network resource allocation system 300, a resource consumer 310 may concurrently be a resource provider and vice versa.

The resource 301 is memory, processors, storage, bandwidth, etc. and it is controlled within the local environment of a resource provider. Moreover, although a whole resource 301 is depicted in FIG. 3 it is to be understood that a single resource 301 may be logically segmented into portions, such that the whole resource 301 depicted in FIG. 3 may actually be a portion of a resource 301.

The identity service 302 is a management or registration service. In some embodiments, the identity service 302 is a modified version of the identity services described and incorporated by reference above. In other embodiments, the identity service 302 is a modified version of existing registration services that is designed to achieve the processing presented herein.

A resource provider registers the resource 301 with the identity service 302. Registration includes identifying how a resource consumer 310 should reference the resource 301 to gain allocation of the resource 301 over the network. Moreover, in some embodiments, registration may indicate the authentication techniques used by the resource 301 or the resource provider that would permit secure and trusted access to the resource 301. Additionally, in still more embodiments, the registration may include consumption specifications or policies for consuming the resource 301. In some cases, these specifications or policies are global and provided or configured within the identity service 302 separate from the registration process.

For any single transaction that is processed through the network resource allocation system 300, the resource consumer 310 is separate and distinct from a particular resource provider, and the two are located remotely from one another over a network. Thus, the two may be geographically dispersed from one another over the network. The identity service 302 may be also geographically dispersed over the network separately from the resource consumer 310 and the resource provider. Alternatively, in some arrangements of the network resource allocation system 300, the identity service 302 may be local to either the resource consumer 310 or the resource provider. In other arrangements, the identity service 302 may interact with other instances of identity services 302 for purposes of facilitating the allocation of the resource 301 for a given transaction.

After the resource 301 is registered with the identity service 302, a resource consumer 310 makes a request for the resource 301 or for a generic resource. That is, the resource consumer 310 may specifically identify the resource 301 with a request or may generically provide information in the request which permits the identity service 302 to resolve the identity of the resource 301.

The resource consumer 310 is authenticated to and trusted by the identity service 302. This trusted relationship may have been pre-established before the request for the resource 301 was received by the identity service 302 or may be dynamically established with the request. In a like manner, the resource provider of the resource 301 is authenticated to and in a trusted relationship with the identity service 302.

When a request from a resource consumer 310 is received by the identity service 302, the identity service identifies the resource 301 that satisfies the request, determines if any policies prohibit allocation of that resource, determines if the resource consumer 310 and resource provider can enter into a trusted relationship, and provides authentication information to the resource consumer 310. Optionally, the identity service 302 may also identify the authentication technique needed by the resource 301 or resource provider to the resource consumer 310. In some embodiments, the identity service 302 may also provide a consumption specification to the resource consumer 310.

The authentication information provides the resource consumer 310 with data that will permit it securely authenticate and communicate with the resource 301 and/or the resource provider. Again, this information may be public certificates of the resource 301 and/or provider, signatures, keys, etc. Conversely, when the resource 301 or the resource provider receives this authentication information it may or may not be able to authenticate the resource consumer 310 on its own. In cases where it cannot independently authenticate the resource consumer 301, the resource provider contacts the identity service 302 and asks it to authenticate the resource consumer 310 on its behalf.

Once a resource consumer 310 authenticates to the resource 301 and/or resource provider, the resource provider allocates the resource 301 for access to the resource consumer. Access may be circumscribed by policies or specifications, and the policies or specifications may be hierarchical. Moreover, access may have policies that indicate access expiration, such that when a condition or event is detected access is terminated.

In some embodiments, utilization metrics used in resolving policies may be communicated from the resource provider to the identity service 302. Alternatively, in cases where the identity service 302 fully manages resource 301 assignments, the identity service 302 may estimate or resolve utilization metrics for the resource 301 on its own.

Utilization metrics provide unique and novel features to the network resource allocation system 300, which permit the network resource allocation system 300 to load balance a potentially infinite amount of distributed resources 301 over a Wide Area Network (WAN), such as the Internet. Resource allocation and access is achieved in secure and trusted manners, even though the environment is chaotic meaning that new resources 301 come into the network resource allocation system 300 while other resources 301 are removed and modifications are continually and dynamically being received which change usage requirements of the resources 301.

The network resource allocation system 300 is designed to interact with multiple resource providers, multiple resource consumers 310, and multiple instances of identity services 302. Thus, additional resources 303 may be managed by the network resource allocation system 300 where these additional resources 303 are associated with the same resource provider of the original resource 301 and/or associated with other independent resource providers.

Figure 4:
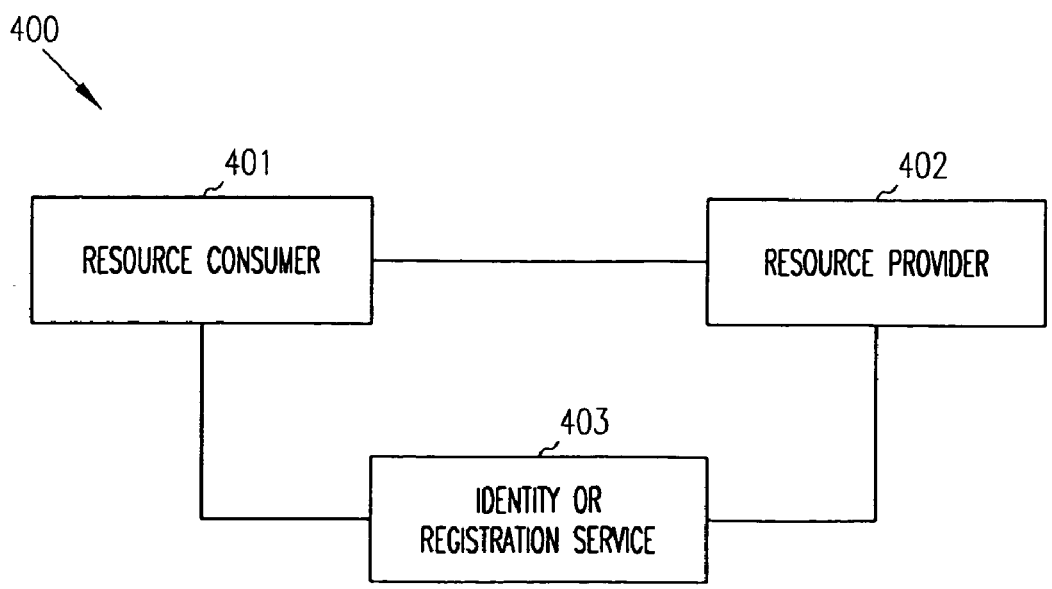
FIG. 4 is a diagram of another network resource allocation system, according to an example embodiment of the invention.

FIG. 4 is a diagram of another network resource allocation system 400. The network resource allocation system 400 is implemented in a machine-accessible and readable medium and is operational over a network. The components of the network resource allocation system 400 may be implemented in hardware, software, or combinations of hardware and software. In one embodiment, the network resource allocation system 400 implements, among other things, the methods 100 and 200 of FIGS. 1 and 2.

FIG. 4 is an alternative arrangement and view of previously presented FIG. 3. In FIG. 4, the three entities that participate in allocating a resource over the network are shown. This provides an alternative arrangement to the network resource allocation system 300 of FIG. 3. It is to be understood, that both FIGS. 3 and 4 are presented for purposes of illustration only, such that other components and/or arrangements of components which are designed to achieve the novel network allocation of the present invention are intended to still fall within the generous scope of this invention.

The network resource allocation system 400 minimally includes a resource consumer 401 and resource provider 402. In one embodiment, the network resource allocation system 400 also includes an identity or registration service 403. Thus, in the arrangement of network resource allocation system 400 of FIG. 4 only two components are needed, a resource consumer 401 and a resource provider 402 where these components interact to allocate a resource over a network in a novel manner described herein.

The resource provider 402 makes or intends to make one or more of its resources or portions of a resource available to a resource consumer 401. To do this, the resource provider 402 identifies the resource either directly or indirectly to the resource consumer 401. In one embodiment, indirect identification of the resource occurs via an identity or registration service 403. The identity or registration service 403 performs operations and processing similar to the identity service 302 of FIG. 3.

The resource consumer 401 acquires the identity of the resource(s) whether directly from a resource provider 402 or indirectly through the identity or registration service 403. In addition, the resource consumer 401 acquires authentication information that permits it to authenticate to the resource and/or resource provider 402. In one embodiment, the identity or registration service 403 facilitates distributing this authentication information to the resource consumer 401. In another embodiment, the resource consumer 401 acquires this information in a different and secure manner and manually supplies the same to the resource provider 402.

In some embodiments, the resource consumer 401 also acquires a consumption specification either directly from the resource provider 402 or indirectly via the identity or registration service 403. The specification defines the usage limitations for the resource on the resource provider 402.

Once the resource consumer 401 is authenticated to the resource and/or resource provider 402, the resource consumer 401 and the resource and/or resource provider 402 are in a trusted and secure relationship. The resource provider 402 then allocated the resource to the resource consumer. Again, access may be circumscribed by policies or specifications. Information exchanged during access is securely communicated between the resource and the resource consumer 401.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method implemented in a machine-readable medium that executes on a machine and for allocating a resource, comprising:

receiving a request to allocate at least a portion of a resource, availability of the portion of the resource was previously published to a trusted third party along with resource characteristics that include a processing speed for the resource, a memory speed for the resource, a memory size for the resource, a storage size for the resource, and a bandwidth capability for the resource, and a decision to make the portion of the resource available was based on a deciding event that is represented as a trust credential that conforms to contractual arrangements for the resource, the portion of the resource is not available unless the trust credential remains valid;

dynamically establishing a trust relationship between the resource and a requestor that issues the request via the trusted third party and the trusted third party is remotely located over a network separately from the resource and the requestor, the trust relationship is established by acquiring authentication information and an authentication technique for the requestor to use with the authentication information, the authentication information and the authentication technique acquired from the trusted third party;

allocating at least the portion of the resource to the requestor, when the trust relationship was successfully established, and the resource and the requestor securely interact with one another thereafter;

providing a consumption specification to the requestor, the consumption specification defining utilization restrictions on usage of the resource by the requestor, the consumption specification hierarchical having global specifications of an enterprise that override local specifications for groups of users for conflicts occurring with the utilization restrictions.

2. The method of claim 1 further comprising, acquiring one or more policies that drive the consumption of the resource by the requestor.

3. The method of claim 1 further comprising, communicating secure information between the requestor and the resource, while at least the portion of the resource is allocated to the requestor.

4. The method of claim 1 further comprising, registering at least the portion of the resource with an identity service before receiving the request, wherein the registration is acquired by the requestor through the identity service.

5. The method of claim 1, wherein dynamically establishing further includes dynamically interacting with an identity service to establish the trust relationship after the request is received.

6. A method implemented in a machine-readable medium that executes on a machine and for facilitating the allocation of resources, comprising:

receiving, at an identity service, registrations from resource providers, wherein the registrations identify resources that may be accessed over a network by resource consumers;

receiving, at the identity service, requests from the resource consumers for desired consumption of the resources; and facilitating, at the identity service, allocation of the resources to the resource consumers by providing the resource consumers with authentication information and authentication techniques for acquiring specific ones of the resources from the resource providers, at least some of the authentication information distributed as alias names for anonymous usage of the resources by one or more of the resource consumers, the identity service is separately and remotely located over the network from the resource providers and the resource consumers, and the resource consumers use the authentication information and the authentication techniques to authenticate to the resources via the resource providers, and the identity service receives the requests with characteristics that the identity services matches to published characteristics for the resources, the identity service validates trust specifications for the resource consumers before matching the characteristics received with the requests to the published characteristics to identify the resources to allocate to the resource consumers, and the characteristics and the published characteristics include processing speed of the resources, memory speed of the resources, memory size of the resources, storage size of the resources, and bandwidth capability of the resources.

7. The method of claim 6, wherein receiving the requests further includes receiving the requests as generic requests from the resource consumers not directed to any specific resource provider.

8. The method of claim 7 further comprising, managing the assignment of a number of the resources to the generic requests based on existing usage patterns or policies associated with the resource providers.

9. The method of claim 6, wherein receiving the requests further includes receiving the requests from the resources consumers, wherein the requests are directed to specific ones of the resources.

10. The method of claim 6, wherein facilitating further includes providing a number of the resource consumers with consumption specifications which dictate the conditions under which access to a number of the resources is to conform when communicating with a number of the resource providers.

11. The method of claim 6 further comprising, identifying at least one resource provider as one of the resource consumers.

12. The method of claim 6 further comprising, periodically receiving, from the resource providers, utilization metrics for registered resources.

13. The method of claim 12 further comprising, determining which of the resources to identify to the resource consumers based on thresholds associated with the utilization metrics.

14. A method implemented in a machine-readable medium that executes on a machine and for acquiring allocation of a resource, comprising:
querying an identity service for available resources using characteristics that the identity service matches to published characteristics to identify the resources, and the identity validates a trust specification for the resources before matching the characteristics to the published characteristics, and the characteristics and the published characteristics include processing speed of the resources, memory speed of the resources, memory size of the resources, storage size of the resources, and bandwidth capability of the resources;
receiving at least one resource identifier for a specific resource;
receiving a trust certificate and authentication technique from the identity service for a resource provider of the specific resource, the resource provider is separate and remote from the identity service over a network; and
initiating communication with the resource provider by supplying the trust certificate and using the authentication technique, the communication results in the specific resource being allocated for use and the usage of the specific resource circumscribed by a consumption specification received from the identity service, the consumption specification defined as hierarchical policies having global rules used to enforce priority of the usage on the specific resource.

15. The method of claim 14 further comprising, accessing the specific resource over the network, wherein the resource is used for at least one of storage, memory, processing, and bandwidth access.

16. The method of claim 14, wherein querying further includes inspecting a list acquired from the identity service which presents the available resources for selection.

17. A network resource allocation system implemented in a machine-readable medium that executes on a machine, comprising:
a resource located on a resource provider; and
an identity service, the resource provider registers the resource with the identity service, the identity service identifies the resource to a resource consumer in response to characteristics received from the resource consumer that match the resource, and the characteristics include processing speed of the resource, memory speed of the resource, memory size of the resource, storage size of the resource, and bandwidth capability of the resource and when a trust specification for the resource with respect to the resource consumer is validated, the resource consumer is located remotely over a network from the resource provider and from the identity service, and the identity service provides to the resource consumer authentication information and authentication techniques for authenticating anonymously to the resource provider via an alias name and acquiring allocation to the resource, and the identity service is remotely located over the network from the resource provider and the resource, and resource consumer uses the authentication information and the authentication techniques to authenticate to the resource via the resource provider and thereafter the resource consumer and resource securely communicate with one another.

18. The network resource allocation system of claim 17, wherein the identity service manages a consumption specification for the resource, wherein the consumption specification defines the conditions of consumption for the resource consumer, and wherein the consumption specification is provided by the resource provider.

19. The network resource allocation system of claim 17, wherein the identity service manages policies associated with identifying the resource to the resource consumer.

20. The network resource allocation system of claim 17, wherein the identity service periodically acquires utilization metrics from the resource provider and uses a policy associated with the resource or resource provider to determine when it is appropriate to identify the resource to the resource consumer.

21. The network resource allocation system of claim 17, wherein the resource provider registers additional resources with the identity service which may be identified to the resource consumer or other resource consumers, wherein the resource provider provides priorities for the resource and the additional resources, and wherein the identity service in response to the priorities makes decisions about which of the resource or the additional resources to identify to which of the resource consumer or the other resource consumers.

22. The network resource allocation system of claim 17 further comprising, additional resources which are registered with the identity service by other resource providers.

23. The network resource allocation system of claim 17, wherein the identity service provides the resource consumer with a public certificate, public key, or trust certificate of the resource provider as part of the authentication information.

24. A network resource allocation system implemented in a machine-readable medium that executes on a machine, comprising:
a resource provider; and
a resource consumer, wherein the resource provider identifies one or more resources which are available to be allocated to the resource consumer when trust specifications for the resources permit and in response to characteristics supplied by the resource consumer that match published characteristics of the resources, the characteristics and the published characteristics include processing speed of the resources, memory speed of the resources, memory size of the resources, storage size of the resources, and bandwidth capability of the resources, the resource consumer acquires the identity of the resource and authentication information for interacting with the resource provider in order to acquire allocation to at least a portion of the one or more resources, and the resource consumer acquires the identity and the authentication information via a third party service that is remotely located over a network from the resource provider and from the resource consumer, and the resource consumer also acquires an authentication technique that the resource consumer uses with the authentication information to authenticate to a particular resource via the resource provider and thereafter the resource consumer securely communicates with that particular resource and usage of the particular resource is circumscribed by a particular trust specification that is hierarchical having global specifications that override local specifications for conflicts occurring with the usage.

25. The network resource allocation system of claim 24 further comprising, an identity service that identifies the one or more resources and dynamically provides the authentication information to the resource consumer, wherein the identity service is the third party service.

26. The network resource allocation system of claim 24, wherein the resource consumer contacts a registration service to at least acquire the identity of the one or more resources and the authentication information, wherein the registration service is the third party service.

27. The network resource allocation system of claim 24, wherein the resource consumer acquires a consumption specification that dictates the conditions under which at least a portion of the one or more resources may be accessed by the resource consumer.

28. The network resource allocation system of claim 24, wherein the resource consumer and the resource provider are in a trusted relationship when the resource consumer accesses at least a portion of the one or more resources on the resource provider.

29. The network resource allocation system of claim 24, wherein information exchanged between the resource provider and resource consumer during access of the at least a portion of the one or more resources is communicated in a secure manner.

30. The network resource allocation system of claim 24, wherein the resource is at least one of storage, a processor, memory, and bandwidth, which is under the control of the resource provider.

31. The network resource allocation system of claim 24, wherein an identity of the resource consumer is concealed or held anonymous from the resource provider and/or wherein an identity of the resource provider is concealed or held anonymous from the resource consumer during the interactions.

* * * * *